Figure 1:
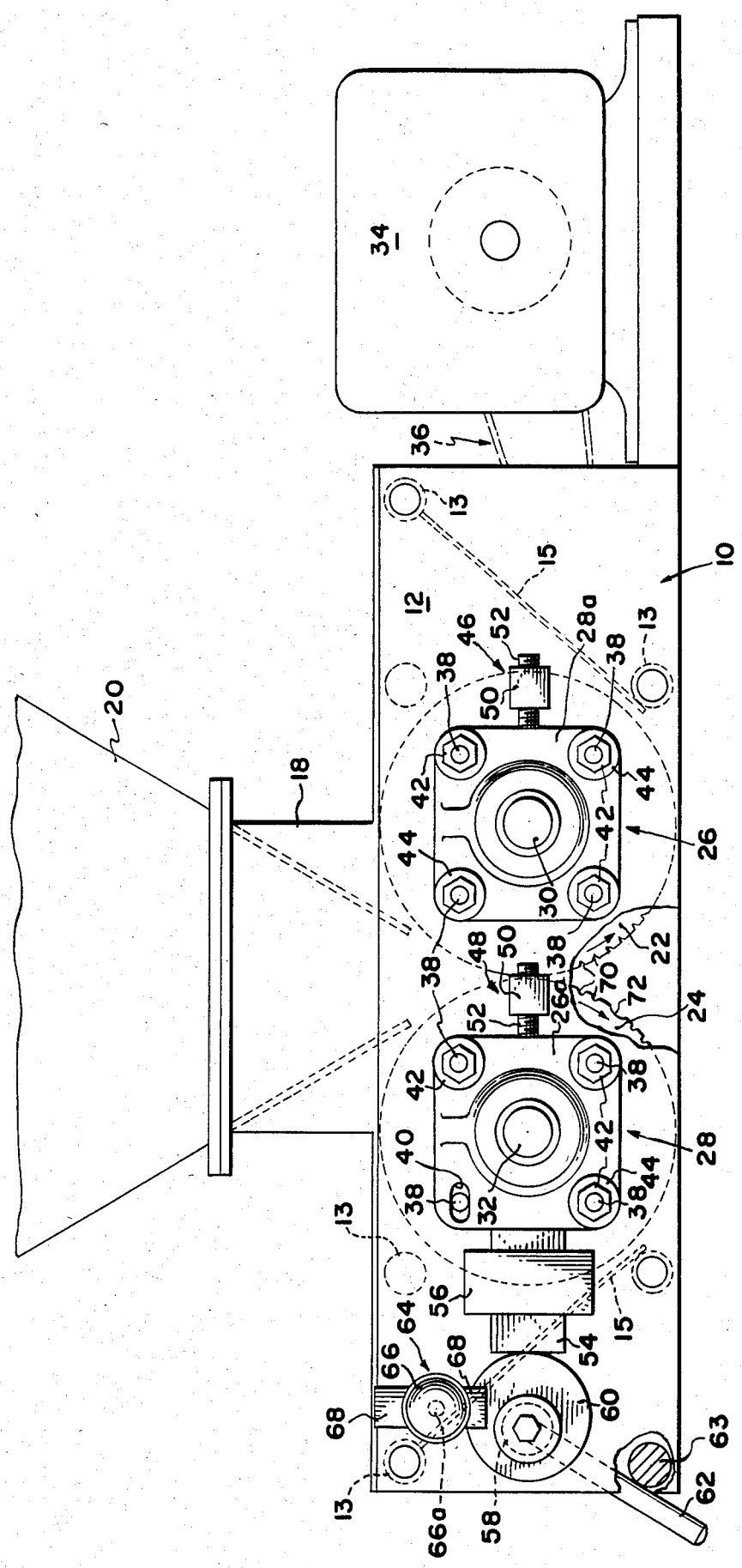

United States Patent [19]

Wood

[11] Patent Number: 4,608,007

[45] Date of Patent: Aug. 26, 1986

[54] OAT CRIMPER

[76] Inventor: Errol A. Wood, 3038 Lupine Dr., Bay City, Mich. 48706

[21] Appl. No.: 754,657

[22] Filed: Jul. 15, 1985

Related U.S. Application Data

[63] Continuation of Ser. No. 494,352, May 13, 1983.

[51] Int. Cl.$^4$ ............................................. A23P 1/00
[52] U.S. Cl. .................................... 425/363; 99/575; 99/618; 99/621; 100/907; 241/230; 241/235; 241/286
[58] Field of Search ................ 241/32, 230, 234, 286, 241/232, 233, 222, 235, 242, 227; 99/575, 618, 621, 450.2; 425/363; 100/907

[56] References Cited

U.S. PATENT DOCUMENTS

| 259,858 | 6/1882 | Holt | 241/235 |
| 1,311,352 | 7/1919 | Jones | 241/230 |
| 2,738,135 | 3/1956 | Cecka | 241/230 |

FOREIGN PATENT DOCUMENTS

| 441647 | 8/1912 | France | 241/234 |
| 8371 | of 1890 | United Kingdom | 241/235 |
| 6958 | of 1915 | United Kingdom | 241/230 |
| 161739 | 4/1921 | United Kingdom | 241/230 |
| 200437 | 7/1923 | United Kingdom | 241/230 |
| 543404 | 3/1977 | U.S.S.R. | 241/230 |

Primary Examiner—Mark Rosenbaum
Assistant Examiner—Joseph M. Gorski
Attorney, Agent, or Firm—Learman & McCulloch

[57] ABSTRACT

A roller mill for cracking or crimping oats or the like is constructed with a cam adjustment which will positively maintain the rollers at an adjustably selected minimum spacing and which can be readily adjusted to establish a wider spacing for handling coarser materials or to clear obstructions from the rollers.

3 Claims, 2 Drawing Figures

OAT CRIMPER

This is a continuation of co-pending application Ser. No. 494,352 filed on May 13, 1983.

BACKGROUND OF THE INVENTION

The present invention concerns roller mills of the type which have been used for many years to crack or crimp grain, such as oats or corn. It is particularly concerned with the crimping of oats but makes provision, also, for cracking corn. The material to be cracked or crimped is gravity fed into the nip between a pair of opposed rollers which are spaced from each other by a distance selected in accordance with the material being handled which is such that the granular material has its shell cracked, but the grain itself is not unduly crushed or pulverized. This cracking and flattening of the outer shell, in the case of oats, for example, makes the oats more readily digestable by horses and it is estimated that a horse obtains the same amount of nutrition from one pound of oats which have been so cracked, as it would from up to one and one-half pounds of oats which have not been processed in this manner.

Because the objective of such mills is to crack or rupture the outer shell of the material without unduly crushing the material inside, the spacing between the two rollers must be related to the size of the grains or kernels of the material being cracked. Oats, for example, require a much smaller spacing than corn.

The prior art discloses various devices for adjusting the spacing between rollers of mills of the general type under discussion, see, for example, Hesse Pat. No. 3,208,677 and Glaser Pat. No. 2,144,841. However, the prior art spring adjustment mechanisms tend to be unnecessarily complex and do not operate positively in a manner which assures a precision operation in which most of the oats passing through are crimped.

The present invention is especially directed to a high capacity, heavy duty crimper having precision mechanism for accommodating the shifting of the axis of one roller toward and away from the axis of another roller which is of a simple, but positive acting construction which accurately maintains the axes of the two rolls in parallelism during such movement and the cam locks them in a particular relative position.

A further object of the invention is to design an oat crimper which can be readily fine tuned, and in which the operator is automatically aware when the proper nip for oat crimping is achieved and cannot narrow the nip beyond that spacing to a spacing which would unduly crush and damage the oats being processed. Still a further object of the invention is to provide a roll crimper having precision for positively assuring crimping, while, also, providing the versatility to process corn, and then oats in succession, and to process any remnant kernels of corn, and the versatility to remove any foreign object which might inadvertently reach the rollers.

SUMMARY OF THE INVENTION

In accordance with the present invention, a mill is constructed with a pair of rolls rotatably mounted at their opposite axial ends for rotation within bearing assemblies adjustably mounted upon the mill frame. Adjustable stop means are associated with the bearing assemblies of one of the rolls to establish the minimum distance or spacing between the two rolls. The bearing assemblies of this roll are mounted in the frame for movement toward and away from adjustable stops. A cam shaft is journaled for rotation in the frame about an axis parallel to the axes of the two rolls, and at opposite sides of the frame to rotatably align eccentric cams which are fixed to the cam shaft. The cams engage the follower portion on each of the two bearing assemblies and rotation of the cam shaft, to a position at which a relatively large radius section of the eccentric cams engages the follower portions of the bearings, will force the bearings against the adjustable stops and positively maintain the bearings in engagement with the stops. When so engaged, the spacing between the rolls is positively maintained at the spacing originally set.

Should the rolls become jammed by some foreign material, such as a stone, the cam shaft may be manually rotated so that a smaller radius section of each eccentric cam engages the follower on each bearing and the one roll can move away from the other roll to permit the foreign object to be easily removed. This same procedure may be employed to establish a wider spacing between the rolls if it is desired to pass coarser material, such as corn, through the mill.

To assist in feeding material into the nip between the rolls, the rolls are formed with a plurality of axially extending grooves in their outer periphery. To assist in passing minor amounts of material which may be of larger size than the material being handled, one of the grooves on a roll is made of a width substantially greater that the remaining grooves in order to capture and feed remnant grains which may be too large to be gripped by the conventional grooves.

Other objects and features of the invention will become apparent by reference to the following specification, and to the drawings.

THE DRAWINGS

Figure 2:
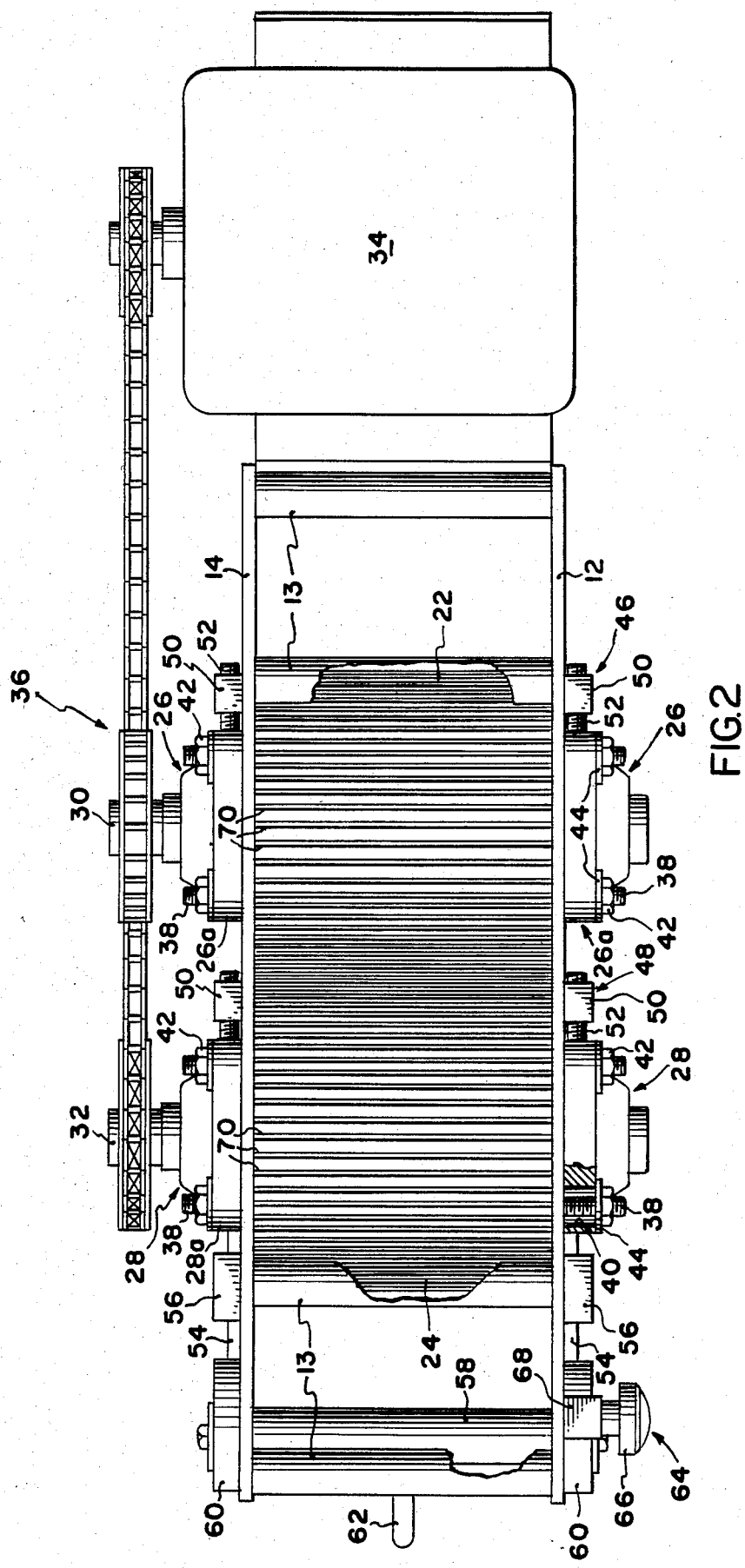

FIG. 1 is a side elevational view, with certain parts broken away or omitted, of a roller mill embodying the present invention; and FIG. 2 is a top view of the mill of FIG. 1, with the cover plate removed.

A mill embodying the present invention includes a fixed frame designated generally 10 which includes a pair of spaced parallel side plates 12 and 14 connecting spacers 13, and divergent end plates 15. A cover plate 16 (shown only in FIG. 1) rests upon and is secured to the upper edges of side plates 12 and 14 and is constructed with a centrally located inlet chute 18 upon which a material receiving hopper, indicated at 20 in FIG. 1, may be detachably mounted. A pair of like rollers 22 and 24 are mounted for rotation within frame 10 by bearing assemblies designated generally 26 and 28 which are mounted at the outer sides of each of side walls 12 and 14, and rotatably receive shafts 30 and 32 of the respective rollers 22 and 24.

A drive motor 34 is mounted at one end of frame 10 and drives the respective rollers in coordinated rotation at a relatively slow speed such as 60 r.p.m. by a chain and sprocket arrangement of conventional and well known construction, designated generally 36 in FIG. 2. As viewed in FIG. 1, roller 24 is driven in a clockwise direction and roller 22 is driven in a counter clockwise direction so that material passing from inlet chute 18 is carried downwardly by the rollers into the nip between the rollers where it is cracked and then drops, by gravity, clear of the mill after it has passed through the nip between rollers 22 and 24.

The four bearing assemblies are mounted upon the side plates in a manner such that each bearing assembly may be adjusted horizontally toward or away from the adjacent bearing assembly. This mounting arrangement includes, for each bearing assembly, four threaded studs 38 welded to and projecting outwardly from the associated side plate. The bearing housing 26a, 28a is formed with four corresponding openings 40 (see the upper left portion of bearing housing 28a in FIG. 1) which are horizontally elongated so that the bearing housing can be shifted horizontally relative to its associated side wall. The bearing housing 26a, 28a is held against the side wall by a nut and washer 42, 44 mounted on each of the studs 38. The roller shafts 30 and 32 pass through enlarged openings, not shown, in side walls 12 and 14 so that movement of the bearing assemblies 26, 28 to the right, or to the left, as viewed in FIG. 1 can correspondingly shift the location of the associated roller.

Referring particularly to FIG. 1, at the right-hand side of each bearing assembly there is located a stop element designated generally 46 and 48 which, in each case, consists of a block 50 welded to the side wall and threadably receiving a set screw 52 whose left-hand end, as viewed in FIG. 1, bears against the adjacent side of the adjacent bearing housing 26a or 28a.

Each of bearing housings 28a has a projecting follower bar 54 fixedly secured, as by welding, to the bearing housing. Follower bars 54 are slidably received within retaining brackets or slide bearings 56 fixedly secured, by suitable means not shown, to the respective side walls 12 and 14.

At the end of frame 10, remote from motor 34, a cam shaft 58 is rotatably received within openings in side walls 12 and 14 for rotation about an axis parallel to the axes of rollers 22 and 24. At the outer side of each side wall 12 and 14, an eccentric cam 60 is fixedly mounted upon shaft 58 for rotation with the shaft. A manually operable lever 62 is likewise fixedly mounted to the cam shaft at a central location so that the cam shaft can be manually rotated as desired. When lever 62 is engaged with indicator cross bar stop 63, as shown in FIG. 1, the proper nip setting for oats, (i.e., about 0.015 of an inch) is reduced and automatically indicated. When lever 62 is horizontal the proper setting for corn, (i.e., about 0.125 of an inch) is reached. Unless lever 62 is moved, the cams 60 maintain the nip between the rolls, the cams 60 acting as locks to prevent spreading of the rolls. With lever 62 in engagement with stop 63, the nip also cannot be narrowed. Thus, there is positive assurance that the oats will be crimped but not crushed. A cam clamping mechanism designated generally 64 is also mounted upon a side wall 12 and includes a clamping knob 66 fixed on a clamp screw 66a, rotatably threaded into the side wall 12, which bears against a clamp plate 68 which, upon tightening down of the knob 66 will frictionally clamp the adjacent cam 60 against side wall 12 to positively assure that cam shaft 58 is maintained at a selected rotative position, even though lever 62 is inadvertently bumped.

The mill described above is set up for operation as follows. The position of roller 22 relative to frame 10 is first generally established with the nuts 42 associated with the bearing assemblies 26 being loosened, and the respective bearing housings 26a being located relative to the frame at the desired position, adjustment of the set screw's assemblies 46 being of assistance. When the two bearing assemblies 26 are accurately aligned, the bearing assemblies 26 may be clamped in position by tightening the associated nuts 42 to firmly clamp bearing housing 26a against the side frame members in the adjusted position.

After the bearing assemblies 26 have been located as described above, the next step is to locate the bearing assemblies 28 at a position such that the desired spacing between the two rolls 22 and 24 will be established. To locate the bearing assemblies 28, cam shaft 58 is rotated to locate the maximum radius section of the cams in opposed relationship to the follower bars 54, which will find operating lever 62 in a lowered position. The bearing assemblies 28 are then manually held against the set screws 52 of the associated stop assemblies 48 and the set screws 52 are adjusted until the desired spacing between rolls 22 and 24 is achieved for oats, with bearing housings 28a in contact with their associated set screws 52 and followers 54 engaging cams 60 at a time when lever 62 engages stop 63.

After the adjustment has been accomplished, the nuts 42 associated with bearing assemblies 28 are threaded down to a point where the bearing housings are held against the associated side frame members with a very light pressure which will permit sliding movement of the bearing assemblies 28 relative to the associated side walls, while at the same time maintaining the respective bearing housings 28a in contact with the associated side walls. The roll 24 is now at the desired spacing from roll 22 and will positively be maintained in this position until the cam actuating lever 62 is rotated upwardly as viewed in FIG. 1 to carry a smaller radius section of each cam into alignment with the follower bars 54 to thereby accommodate leftward movement of the bearing assemblies 28 from the associated stops 48.

The "set" of the roller 24, once achieved, need not be varied thereafter. Should some foreign object, such as a stone or the like become mixed with the incoming material and refuse to feed between the rollers, the cover may be removed and the cams 60 can be backed off to relax the grip of the rollers on the object and permit its removal.

To assist in feeding the material downwardly into the nip between the rolls, the outer periphery of the rolls is formed with a series of relatively closely spaced ($\frac{1}{4}$ inch) relatively narrow grooves 70 (about 1/16 inch in width and, 0.020 inch in depth) which will bite into the material and assist in feeding it downwardly into the nip. To assist in passing objects which are somewhat larger than the material being handled, such as remnant kernels of corn from a prior corn cracking operation, when the lever 62 is manipulated to the FIG. 1 position to crack oats, one of the rollers is provided with a groove such as 72 which is substantially wider than the regular grooves 70, the wider groove 72 (about $\frac{3}{8}$ inch in width and 0.015 inch in depth) being more efficient in gripping and feeding the remnant corn, which otherwise would not be gripped with sufficient purchase by the grooves 70 to be fed through the nip.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In a precision oat crimper for crimping oats without dehulling them, and for ancillarily cracking corn: a frame; a pair of cylindrical crimping rollers of equal diameter mounted for rotation about generally horizontally spaced parallel axes lying in a generally horizontal plane, the rollers defining a nip between said rollers, each of said rollers having a cylindrical peripheral surface that is broken by a plurality of first uniformly circumferentially spaced, axially extending linear grooves that substantially cover the peripheral surface, each groove having a uniform width of substantially 1/16th of an inch and a uniform depth of substantially 0.020 of an inch, and one of said rollers having an additional second axially extending linear groove in the peripheral surface of said one of said rollers, said second axially extending linear groove having a width of substantially ⅜ of an inch and of a depth of substantially 0.015 inches; drive means for driving said rollers about their axes in counterrotation at equal peripheral speeds to feed oats or corn downwardly between said rollers; a hopper supported on said frame at a level to feed the oats or corn downwardly to the nip between the rollers; axially spaced apart pairs of bearings on said frame, said bearings rotatably supporting ends of each of said rollers, each of the bearings of one pair of bearings having a slide connection with said frame being supported for sliding movement on said frame in a direction parallel to the generally horizontal plane in which said axes lie; a rigid follower slide rigidly fixed to each side of each of the bearings of said each pair of bearings and projecting from said one side in an outboard direction away from said nip; a shaft means extending parallel to said axes and being journaled by said frame outboard of said follower slides; a pair of rigid eccentric cams on said shaft means, said cam each having an eccentric portion in direct surface to surface contact with said follower slides; and means connected with said shaft means for manually revolving said shaft means to cause the eccentric portion of each cam in contact with the follower slides to positively move said slides and positively move said one pair of bearings an increment that corresponds to each increment of movement of said eccentric portions, thereby moving one roller to a position of minimum spacing for oats from a second, more spaced, position for cracking of corn, wherein the follower slides and bearings are locked in said positions by said eccentric portions and are movable only with simultaneous rotation of said shaft means.

2. The oat crimper defined in claim 1 wherein the grooves in the peripheral surfaces of said rollers are spaced substantially ¼ inch apart.

3. The oat crimper of claim 1 wherein each of the bearings of both pairs of bearings has a slide connection with the frame and is supported for sliding movement on said frame in a direction parallel to the generally horizontal plane in which the axes lie; set screw stops are provided on the frame in positive engagement with a side of each of said one pair of bearings opposite the side from which the follower slides project; and separate set screw stops are provided on the frame in positive engagement with a side of each of the other pair of bearings which is remote from said one pair of bearings.

* * * * *

UNITED STATES PATENT AND TRADEMARK OFFICE
CERTIFICATE OF CORRECTION

PATENT NO. : 4,608,007

DATED : August 26, 1986

INVENTOR(S) : Errol A. Wood

It is certified that error appears in the above-identified patent and that said Letters Patent is hereby corrected as shown below:

Column 5, line 25, change "each" to -- one --.

Column 5, line 26, change "each" to -- one --.

Signed and Sealed this

Second Day of December, 1986

*Attest:*

DONALD J. QUIGG

*Attesting Officer*  *Commissioner of Patents and Trademarks*